Aug. 30, 1960

A. J. SPENCER 2,951,239

MAGNETIC CORE STORAGE DEVICES

Filed March 21, 1956

INVENTOR
ARTHUR JAMES SPENCER
BY Hane and Nydick
ATTORNEYS

United States Patent Office 2,951,239

Patented Aug. 30, 1960

2,951,239

MAGNETIC CORE STORAGE DEVICES

Arthur James Spencer, Sutton Coldfield, England, assignor to The British Tabulating Machine Company Limited, London, England, a British company Filed Mar. 21, 1956, Ser. No. 573,003

Claims priority, application Great Britain Apr. 20, 1955

11 Claims. (Cl. 340—174)

This invention relates to magnetic core storage devices.

It is known to make use of magnetic cores as data storage elements. The material of such cores has a hysteresis loop which is approximately rectangular and the core can be magnetised either to a state P or to a state N to represent the presence or absence respectively of a unit of data. A core which is in the P state will be referred to as set, and a core in the N state as unset.

In order to store a digit other than a binary digit a plurality of cores is necessary. Either a separate core can be used for each possible digit, so that in the case of a decimal digit ten cores would be required, or the digit can be coded in a combinational code and each code component stored on a core. A decimal digit coded in this way requires a minimum of four cores. If the cores are read out individually, the data output is still in coded form, and a further de-coding operation is required to obtain the corresponding decimal digit.

It is an object of the invention to provide means for reading out from two or more magnetic cores, an output pulse being obtained only for a particular combination of states of the cores.

It is a further object of the invention to provide means for storing data sensed from a record card in coded form, de-coding of the data being effected during read-out from the store.

According to the invention, data storage apparatus includes two or more magnetic storage cores, each switchable to either of two magnetic states, means for switching the cores individually from an initial state to the alternative state, a resetting winding on each core, a reset circuit adapted to apply a current to the resetting windings in parallel, the current flowing through the windings producing a magneto-motive force tending to switch the cores to the initial state, the magneto-motive force being insufficient to switch any of the cores to the initial state if one or more of the cores is already in the initial state when the current is applied, and means for producing an output signal from a core when it is switched. Means may be provided for setting a combination of cores to represent data according to a pre-determined code, and for applying the current from the reset circuit to the resetting windings of selected combinations of cores in turn.

The invention will now be described, by way of example, with reference to the drawing, in which.

Figure 1:
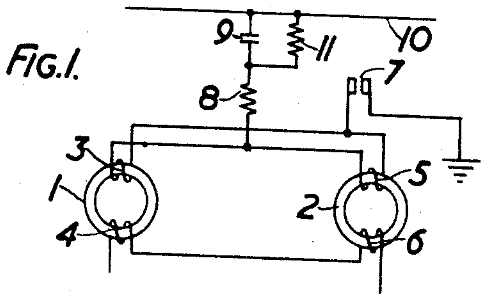
Figure 1 is a diagram of a circuit for reading out from two magnetic cores.

A core 1 (Figure 1) has windings 3 and 4 and a similar core 2 has windings 5 and 6. The two windings 3 and 5 are connected in parallel, and the windings 4 and 6 are connected in series. One side of the windings 3 and 5 can be earthed by closing contacts 7 and the other side of the windings is connected, through a resistor 8 and a capacitor 9 in series, to a supply line 10.

When the contacts 7 are closed, the capacitor 9 begins to charge and a current flows through the windings 3 and 5 and the resistor 8. A resistor 11 across the capacitor ensures that the capacitor is completely discharged before the contacts 7 are closed, but as the discharging time is long compared with the charging time of the capacitor, the effect of the resistor 11 during charging can be neglected.

The direction of the windings 3 and 5 is such that when the charging current flows through them, both cores are driven in the N direction. The circuit constants are such that if both cores are set, they will both be switched to the N state as the capacitor charges. The change of flux which occurs when the cores switch from P to N is linked with the windings 4 and 6. These windings are connected to be series-aiding so that an output pulse appears across them.

If neither core is set, no change is possible as they are both already in the N state so that the output pulse across the windings 4 and 6 will be small.

If one core only is set, for example the core 2, and the other core is unset, the charging current is at first equally divided between the two windings 3 and 5, assuming that their D.C. resistance is equal. As the core 2 is driven towards state N the change of flux becomes much more rapid when the steep portion of the hysteresis loop is traversed and the core represents a higher inductive impedance with the result that a larger proportion of the charging current flows through the winding 3 on the unset core. As the capacitor 9 charges, the current flowing through the winding 5 falls and the resulting magneto-motive force is insufficient to switch the core from P to N, so that when the contacts 7 are opened, the core 2 is left in the P state. Since neither core has been switched, the output pulse produced across the windings 4 and 6 is again small. Thus the output signal in the windings 4 and 6 indicates when both cores are set, this signal being easily distinguishable by its amplitude and duration from the signals produced by the output coils under other conditions of the cores.

If the hysteresis loop of the core material were perfectly rectangular, a pair of cores, one set and the other unset, could be sensed an unlimited number of times without disturbing the stored data. However, nominally rectangular core materials are not perfect in this respect, and there is a tendency for the set core to be gradually magnetised in the N direction by repeated sensing, until finally data stored on the core is destroyed.

Although the operation of the circuit has been described using two cores only, it is possible to use a greater number of cores, in which case the output signal will indicate when all the cores are set. One winding of each additional core is connected in parallel with the windings 3 and 5, and the other winding connected in series with the windings 4 and 6 and the corresponding windings on other cores. The constants of the circuit are such that when all the cores are set, they are all switched from P to N as the capacitor 9 charges. When one or more of the cores are unset, a greater proportion of current flows through the windings on the unset cores and the set cores are not switched.

The limit to the number of cores that can be combined in this way is primarily determined by the ratio of the output signal obtained when all the cores are set to the signal obtained when one core is unset. The requirements of circuit parameters will also set an upper limit to the number of cores that can be combined.

The cores 1 and 2 must both be in the P state in order to obtain an output signal, in the example described above. It is not essential that both the cores be in the same state. The criterion for the production of an output signal is that the magneto-motive force generated by the charging current must be such that each core is driven away from the existing state. For example, if three cores, which are in the P, P and N states respectively, are pulsed, an output signal will be obtained if the connections of the winding on the third core are reversed in relation to those of the other two cores. The first two cores are driven from P to N and the third core is driven from N to P, so that all three cores are switched.

Figure 2:
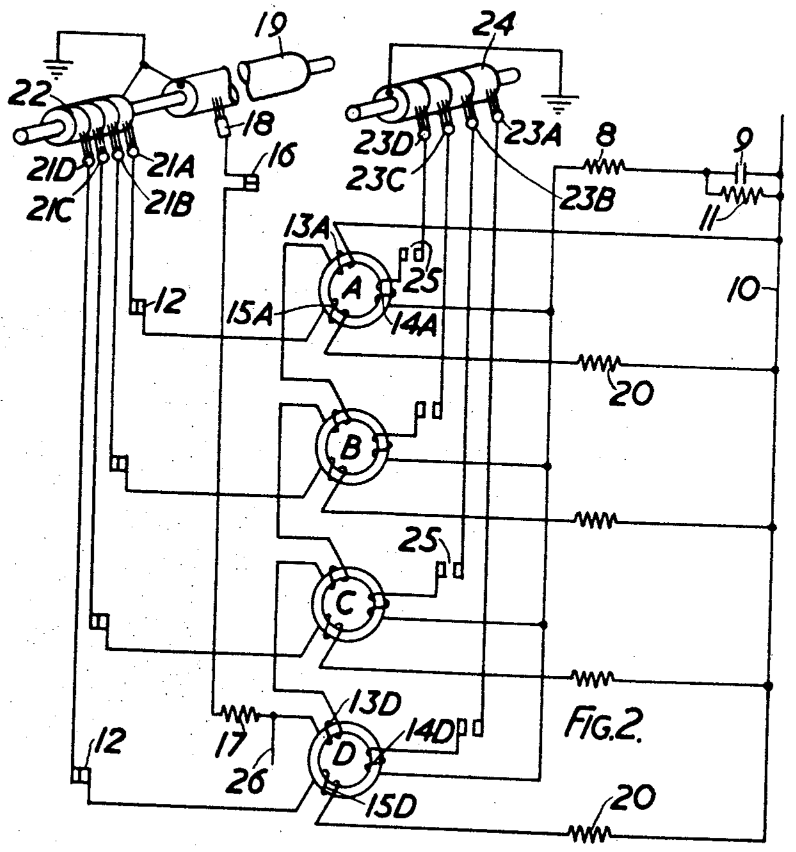
Figure 2 shows a circuit diagram of four cores adapted to store data sensed from one column of a record card, together with means for reading-out the stored data.

In Figure 2 four cores, A, B, C, and D are shown, which are used to store the four code components of a decimal digit sensed from a record card. On the card a digit is represented by a hole punched at a selected position in a column of the card. The times at which these ten possible positions are sensed are referred to as digit times, thus the hole representing the decimal digit six is sensed at "6" digit time.

The digits are entered into the store in a four-component code which is set out below. Six digits are represented by a combination of two components while the remaining four digits are represented by a single code component.

| 9 | 8 | 7 | 6 | 5 | 4 | 3 | 2 | 1 | 0 |
|---|---|---|---|---|---|---|---|---|---|
| AB | CD | AC | BD | AD | BC | A | B | C | D |

Each of the four code components is stored on the corresponding core. These cores are set up at the corresponding digit time under combined control of a commutator and data sensed from the record card.

Each core has three windings 13, 14 and 15. When a winding on a particular core is referred to, the letter reference of that core will be used as a suffix, thus the windings on the core D are 13D, 14D and 15D.

The windings 13 are connected in series. One end of the series is connected to the supply line 10 and the other end is connected through a resistor 17 to contacts 16 which connect the windings to a sensing brush 18. The brush 18 co-operates with a sensing roller 19 and is positioned to sense the selected column of the card.

One end of each of the windings 15 is connected through a resistor 20 to the supply line 10, and the other ends of the windings are connected to contacts 12. By closing the contacts 12 the windings 15 can be connected to brushes 21A, 21B, 21C and 21D on a commutator 22, the brushes being connected to the windings having a similar suffix letter. The sensing roller 19 and the commutator 22 are driven by the same shaft and both are earthed.

When the contacts 12 and 16 are closed and the brush 21A is on a conducting segment of the commutator, the winding 15A is energised, and when the brush 18 senses a hole and makes contact with the sensing roller 19, the windings 13 are energised. The direction of the windings 13 and 15 is such that when they are energised, the cores are driven in the P direction. The values of the resistors 17 and 20 are such that when only one winding on a core is energised, the resulting magneto-motive force is insufficient to switch the core from the state N to the state P, but when both the windings 13 and 15 on a core are energised simultaneously, the combined magneto-motive force is sufficient to drive the core to saturation in the P direction.

The pattern of the conducting segments on the commutator 22 is such that the windings 15 are selectively energised according to the coding of the digit position being sensed. Thus at "6" digit time, brushes 21B and 21D are on a conductive segment and the windings 15B and 15D are energised. The cores are originally set to the N state, as will be described later, so that if no digit is sensed from the card at "6" digit time, the cores B and D will remain in the N state as the windings 13B and 13D are not energised. If a digit is sensed at "6" digit time, the windings 13 on all four cores will be energised. The cores B and D will be switched to the P state as both the windings 13 and 15 on these cores are energised, but the cores A and C will not be switched as only the windings 13 are energised on these cores. Thus at the conclusion of reading-in data to the store, the cores corresponding to the coding adopted will be set.

To read-out the stored data the cores are sensed for each digit in turn under control of a read-out commutator. For the digits 9–4 the cores are sensed in pairs, while for the remaining four digits 3–0 one core only is sensed at a time. When the core or cores storing the code components of the stored digit are sensed, they are switched from P to N and an output signal is produced.

By means of contacts 25 the windings 14 can be connected to brushes 23A, 23B, 23C and 23D of an earthed read-out commutator 24. The other ends of the windings 14 are commoned to the resistor 8 which corresponds to the resistor so numbered in Figure 1. The capacitor 9 and the resistor 11 in Figure 2 correspond to the same components in Figure 1 and are similarly connected.

The pattern of conducting segments on the commutator 24 is such that the windings 14 are connected to the commutator selectively according to the coding adopted. Between each digit pattern on the commutator is a blank portion so that the capacitor has time to discharge through the resistor 11 before the cores are sensed for the next digit.

In reading-out the stored data from the cores, the contacts 12 and 16 are opened to render the commutator 22 and the sensing brush 18 ineffective. The contacts 25 are closed and the commutator 24 is set so that the brushes 23A and 23B are on a conducting segment. The capacitor 9 charges through the windings 14A and 14B. If both cores are set, indicating the presence of a stored "9," both cores will switch from P to N. If, however, only one core of the pair is set, that core will not switch. As the commutator rotates, the brushes next contact a blank portion and the capacitor 9 discharges. The cores C and D are then sensed in a similar manner for a stored "8." This sensing is repeated for all of the digits 9–4. When the cores are sensed for a "3," only the brush 23A is on a conducting segment of the commutator, so all the charging current flows through the winding 14A. If the core is set it will switch to the N state. The cores B, C and D are similarly sensed singly in turn for the presence of a stored "2," "1" or "0."

It will be seen that it is necessary to sense the cores for the combinational-coded digits 9–4 before sensing for the digits 3–0 which are coded with a single component. If this was not done the set cores would be switched to the N state before a combinational-coded digit could be read out.

When a core switches from P to N the change in flux is linked with the windings 13 and an output signal appears across these windings on an output line 26. The timing of the output signal, therefore, indicates the decimal digit stored on the cores. As the cores were set up by a decimal digit indicated by the timed relationship with the commutator 22, it will be appreciated that the output from the store is in the same form as the input, which is of advantage in many applications.

After a read-out cycle all the cores are left in the N state and the store is ready to receive further data. When data is to be entered into the store initially, a dummy read-out cycle is effected to ensure that all the cores are unset.

In some applications it may be desirable to be able to read out the stored data more than once. To do this the cores which have been unset by the operation of reading-out must be set up again.

This can be effected by connecting the junction of the resistor 17 and the contacts 16 to the anode of a gas-filled triode which is fired by the output pulse on the line 26. The anode current of the valve will energise the windings 13, so if the contacts 12 are closed and the contacts 25 are opened, the cores will be set under control of the commutator 22. If this commutator is synchronised with the commutator 24, those cores which are set will be these which have just been read-out. The valve is deionised before the cores are sensed for the next digit. A full description of the use of a valve for providing automatic resetting of a magnetic core is contained in British patent application No. 7,210/55.

If, however, one of the digits 9–4 is stored on the cores and these cores are reset, two further output pulses will be produced when the cores are sensed for the digits 3–0. This second output is suppressed by operating a switch if an output occurs for any of the digits 9–4, this switch breaking the output circuit.

Although the invention has been described as operating in connection with data coded by the use of four code components, it can be used with data expressed in other codes, such as, for example, a "two-out-of-five" code, using five cores to store the five code components. Each digit is then represented by the combination of two code components. If this coding is adopted, the store can be read-out in any order and only one output pulse is produced per read-out cycle, even when the data is retained in the store by resetting the cores.

Although the windings 13 are used both when reading into the store and also when reading out, separate series-connected windings can be used, corresponding to the windings 4 and 6 in Figure 1.

Additional columns of cores can be used to store data sensed from further columns of the card, a single commutator 22 being used for setting up all the columns. When reading out more than one column of cores under control of the commutator 24, isolating diodes must be inserted between each of the windings 14 and the brushes 23 to prevent back-coupling.

What I claim is:

1. Data storage apparatus including a number of bistable magnetic storage cores, a first winding on each of said cores, means operative to selectively energise the first windings to switch the related cores from a first to a second remanence state, a resetting winding on each core, the resetting windings of all cores being connected in parallel, a source of current of predetermined magnitude, a resetting circuit connecting said source to said parallel connected resetting windings to cause current to flow therein in a direction tending to switch said cores from the second to the first state, the current from the said source dividing between the individual resetting windings in accordance with their impedances, the resetting windings associated with the cores in the first and second remanence states presenting low and high impedances respectively, a current effective to switch the related core, flowing in each resetting winding which presents a high impedance and which is shunted only by resetting windings of high impedance and a current ineffective to switch the related core flowing in a resetting winding which presents a high impedance and which is shunted by a winding of low impedance and means responsive to the switching of all the cores from the second to the first state to generate an output signal, the application of current to said resetting windings causing switching of all the cores from the second to the first remanence state only when all the cores are in the second remanence state at the time when the current is applied.

2. Data storage apparatus including a number of bistable magnetic storage cores, a first winding on each of said cores, means operative to selectively energise the first windings to switch the related cores from a first to a second remanence state, a resetting winding on each core, the resetting windings of all the cores being connected in parallel, a source of current of predetermined magnitude, means for connecting said source to said parallel connected resetting windings to cause current to flow therein in a direction tending to switch said cores from the second to the first state, the current from the said source dividing between the individual resetting windings in accordance with their impedances, the resetting windings associated with cores in the first and second remanence states presenting low and high impedances respectively, a current effective to switch the related core flowing in each resetting winding which presents a high impedance and which is shunted only by resetting windings of high impedance and a current ineffective to switch the related core flowing in a resetting winding which presents a high impedance and which is shunted by a resetting winding of low impedance, and an output winding on each core responsive to switching of the related core from the second to the first state to generate an output signal whereby application of current to said resetting windings causes switching of all said cores to the first remanence state to generate an output signal only when all said cores are in the second remanence state when the current is applied.

3. Data storage apparatus including a plurality of bistable magnetic storage cores, a first winding on each of said cores, means operative to selectively energise the first windings to switch combinations of the related cores from a first to a second remanence state to represent data according to a predetermined code, a resetting winding on each core, means operative to connect the resetting windings of a selected combination of cores in parallel, a source of current of predetermined magnitude, means for connecting said source to said parallel connected resetting windings to cause current to flow therein in a direction tending to switch the said selected combination of cores from the second to the first state, the current from the said source dividing between the individual resetting windings in accordance with their impedances, the resetting windings associated with the cores of the combination in the first and second remanence states presenting low and high impedances respectively, a current effective to switch the related core flowing in each resetting winding which presents a high impedance and which is shunted only by resetting windings of high impedance and a current ineffective to switch the related core flowing in a resetting winding which presents high impedance and which is shunted by a winding of low impedance and an output winding on each core responsvie to the switching of the related core from the second to the first state to generate an output signal whereby application of current to said resetting windings of the cores of the selected combination causes switching of all the cores of the combination to the first remanence state to generate an output signal only when all the cores of the selected combination are in the second remanence state when the current is applied.

4. Data storage apparatus as claimed in claim 3, in which the data is represented by a timed impulse and a synchronised switch device selects to the combination of cores to be switched by the impulse.

5. Data storage apparatus as claimed in claim 4, in which the timed impulse is derived from the sensing of a record card, and the switching device comprises a switching commutator synchronised with the card sensing means.

6. Data storage apparatus as claimed in claim 3, in which the reset circuit applies to the resetting windings of the cores a current such that the output signal represents the stored data by its timing.

7. Data storage apparatus as claimed in claim 1, in which the impedance of the reset circuit is primarily capacitative.

8. Data storage apparatus as claimed in claim 7, in which a capacitance means is included in the reset circuit the charging current of said capacitance means constituting the current flowing through the resetting windings.

9. Data storage apparatus as claimed in claim 8, in which a series resistor limits the charging current.

10. Data storage apparatus as claimed in claim 9, in which the capacitance means is shunted by a discharging resistor which is relatively large in value compared to the series resistor.

11. Data storage apparatus as claimed in claim 1 and further, having means operated by the output signal for setting to the alternative state any cores which produce an output signal.

References Cited in the file of this patent

UNITED STATES PATENTS

| | | |
|---|---|---|
| 2,702,380 | Brustman et al. | Feb. 15, 1955 |
| 2,713,675 | Schmitt | July 19, 1955 |
| 2,719,773 | Karnaugh | Oct. 4, 1955 |
| 2,729,807 | Paivinen | Jan. 3, 1956 |
| 2,774,429 | Rabenda | Dec. 18, 1956 |
| 2,779,934 | Minnick | Jan. 29, 1957 |

UNITED STATES PATENT OFFICE

CERTIFICATION OF CORRECTION

Patent No. 2,951,239 August 30, 1960

Arthur James Spencer

It is hereby certified that error appears in the above numbered patent requiring correction and that the said Letters Patent should read as corrected below.

In the grant, lines 2 and 3, for "assignor to The British Tabulating Machine Company Limited, of London, England, a British company," read -- assignor to International Computers and Tabulators Limited, a British company, --; lines 12 and 13, for "The British Tabulating Machine Company Limited, its successors" read -- International Computers and Tabulators Limited, its successors --; in the heading to the printed specification, lines 3 to 5, for "assignor to The British Tabulating Machine Company Limited, London, England, a British company" read -- assignor to International Computers and Tabulators Limited, a British company --.

Signed and sealed this 25th day of July 1961.

(SEAL)
Attest:

ERNEST W. SWIDER
Attesting Officer

DAVID L. LADD
Commissioner of Patents